United States Patent [19]

Greenwood

[11] Patent Number: 5,242,337
[45] Date of Patent: Sep. 7, 1993

[54] CONTINUOUSLY-VARIABLE-RATIO TRANSMISSIONS OF THE TOROIDAL-RACE ROLLING-TRACTION TYPE

[75] Inventor: Christopher J. Greenwood, Preston, England

[73] Assignee: Torotrak (Development) Limited, England

[21] Appl. No.: 852,138

[22] PCT Filed: Nov. 2, 1990

[86] PCT No.: PCT/GB90/01689
§ 371 Date: Apr. 29, 1992
§ 102(e) Date: Apr. 29, 1992

[87] PCT Pub. No.: WO91/06791
PCT Pub. Date: May 16, 1991

[30] Foreign Application Priority Data
Nov. 3, 1989 [GB] United Kingdom ............. 8924816

[51] Int. Cl.⁵ ............................................. F16H 37/06
[52] U.S. Cl. ............................................. 476/10; 74/474
[58] Field of Search .................. 74/200, 474, 512, 560; 476/10, 40, 41

[56] References Cited

U.S. PATENT DOCUMENTS

| | | | |
|---|---|---|---|
| 3,142,189 | 7/1964 | Caldwell et al. | 74/200 |
| 4,056,989 | 11/1977 | Shaffer | 74/200 X |
| 4,086,820 | 5/1978 | Krauss et al. | 74/200 |
| 4,170,438 | 10/1979 | Kondo et al. | 74/200 X |
| 4,275,610 | 6/1981 | Kraus | 74/200 |
| 4,297,918 | 11/1981 | Perry | 74/200 |
| 4,434,675 | 3/1984 | Kraus | 74/200 |
| 4,524,641 | 6/1985 | Greenwood | 74/200 X |
| 4,662,248 | 5/1987 | Greenwood | 74/190.5 |
| 4,698,971 | 10/1987 | Sansone | 74/512 X |
| 5,090,951 | 2/1992 | Greenwood | 74/200 X |

FOREIGN PATENT DOCUMENTS

| | | | |
|---|---|---|---|
| 1122843 | 1/1962 | Fed. Rep. of Germany | 74/560 |
| 0025567 | 8/1983 | France . | |
| 62-46060 | 2/1987 | Japan | 74/200 |
| 156837 | 5/1978 | Netherlands | 74/474 |
| 91/08405 | 6/1991 | PCT Int'l Appl. | 74/200 |
| 1491750 | 7/1989 | U.S.S.R. | 74/474 |
| 1494128 | 12/1977 | United Kingdom . | |
| 2023753 | 1/1980 | United Kingdom . | |

Primary Examiner—Rodney H. Bonck
Assistant Examiner—Ryan W. Massey
Attorney, Agent, or Firm—Davis, Bujold & Streck

[57] ABSTRACT

A continuously-variable ratio transmission of the toroidal-race rolling-traction type, especially in and for an automobile vehicle. The ratio transmitted by the rollers (10) is determined by the position of a double-ended piston (15), the ends of which move in cylinders (17, 16) respectively connected to further cylinders (31, 36) the pistons (33, 38) of which are movable by the opposite limbs of a rocking pedal (42) controlled by the operator. Rocking of the pedal in one direction depresses one such piston (e.g. 33) and releases the other, thereby moving the double-ended piston (15) in one direction and so inducing ratio change in one sense, while rocking the pedal in the opposite direction has the opposite effect. The cylinders (31, 36) of the pedal-controlled pistons may be mounted in a fluid reservoir (34), and formed with ports through which the fluid lines are topped-up from the reservoir each time the pistons (33, 38) rise close to the tops of their strokes.

5 Claims, 2 Drawing Sheets

CONTINUOUSLY-VARIABLE-RATIO TRANSMISSIONS OF THE TOROIDAL-RACE ROLLING-TRACTION TYPE

This invention relates to continuously-variable-ratio transmissions (CVT's) of the known toroidal-race, rolling-traction type, in which the transmitted ratio is determined by the variable orientation of rollers that roll in contact with a part-toroidal race formed on a rotating input disc, and with a similar race formed on a coaxial and contra-rotating output disc. The invention relates particularly to CVT's of this type in which the variable orientation of the rollers is determined hydraulically by the piston position of a hydraulic ram. Some essential components of such a CVT are illustrated schematically in FIG. 1A and 1B of the accompanying drawings, in which an input disc 1, formed with a part-toroidal race 2, is splined at 3 to an input shaft 4 rotatable about an axis 5. The splined connection at 3 causes disc 1 and shaft 4 to rotate together, but allows limited relative axial movement between them. An output disc 6 is mounted on an output shaft 7 which is also rotatable about axis 5. A part-toroidal race 8 is formed on disc 6 so that the surfaces of races 2 and 8 belong to the surface of a common torus formed about the same axis 5 as the shafts 4 and 7. A roller 10, which will typically be one of a set of three such rollers located at 120° angular spacing around axis 5, rolls in contact with races 2 and 8, and an appropriate "end load", as indicated at 9, is exerted upon the discs to urge them axially-together and so achieve the necessary traction-transmitting reaction between the discs and the rollers. Both mechanical and hydraulic means of generating such an end load are well known in the art. By tilting the rollers 10 about a diameter as indicated by arrow 11, the transmitted ratio will be varied. With rollers 10 as shown, contacting input disc 1 at a large radius and output disc 6 at a smaller radius, output disc 6 will rotate faster than input disc 1 and the CVT will therefore be in "high" ratio. If rollers 10 are tilted to an opposite position in which they contact input disc 1 at a small radius and output disc 6 at a larger radius, the CVT will be in "low" ratio. As the arrowed detailed view shows, each roller 10 rotates about an axis 12 within a bearing 13 mounted on a roller carriage 14. In a manner which is known in the art, and shown by way of example in patent specification U.S. Pat. No. 4,662,248, the opposite ends of each carriage 14 of the set of three are formed as pistons 15 mounted to move within cylinders 16 and 17, and the two cylinders are connected by way of hydraulic lines 18, 19 with different outlets of a controlled valve system 20 which is itself in communication both with a source 21 of fluid under pressure and with a drain 22. Each carriage 14 and its cylinders 16, 17 are mounted so that the common axis 23 of the pistons and cylinders, which also constitutes a diameter of the roller 10, lies substantially tangential to the centre circle of the common torus of which the races 2 and 8 form part of the surface. The pistons 15 and with them the carriage 14 and roller 10 can not only move back and forth along axis 23. They can also rotate about the axis, and when they do so the radii (relative to axis 5) at which the rollers contact races 2 and 8 change also, thereby changing the transmitted ratio. As is well know in the art, such a CVT is in equilibrium when the sum of the reactions of each roller 10 against its races, resolved in a direction parallel to the axis 23, is balanced by the nett axial force exerted upon that roller by the fluid in the chambers of cylinders 16 and 17. If the equilibrium is disturbed, initiated either by a change of reaction at the disc/roller interfaces or by an operator demand on valve system 20 and a consequent change in the nett hydraulic force exerted upon the carriage by cylinders 16 and 17, the carriage will move axially, and this movement will be accompanied by a rotation and a change in transmitted ratio until equilibrium is restored at the appropriate new ratio.

A hydraulically-operated CVT, having features of the kind just described in outline, is described in more detail in patent specification GB-C-2023753 as well as in U.S. Pat. No. 4,662,248. The hydraulically-controlled CVT described in GB-C-2023753 is intended to achieve optimum performance in the high-powered driveline of a car or commercial vehicle. In such an application, very sophisticated regulation by mechanisms such as item 20 above is necessary to respond to road conditions, driver demand etc. in a manner which continuously maintains the right balance of pressures in cylinders 16 and 17. A vital component in such a CVT is of course a high powered pump (item 21 above, items 174, F, in the drawings of GB-C-2023753, U.S. Pat. No. 4,662,248 respectively). It is an aim of the present invention to adapt and simplify such a hydraulically-controlled CVT for use where no such power driven pump is available and where less exact pressure balances will suffice. Instead, the necessary hydraulic forces are generated, within an essentially closed-loop hydraulic system, by physical work done by a human operator, for instance the driver of the vehicle in which the CVT will typically be fitted. The CVT according to the invention is therefore to be distinguished from the kind of CVT shown for instance in Patent Specification GB-A-1494128, in which an operator-controlled lever is directly connected to a piston/cylinder unit forming part of a hydraulic circuit within the CVT. However the ratio transmitted by the CVT is determined by a quite separate connection—in that example, a direct mechanical connection—between the lever and those parts of the CVT whose relative movement causes the ratio to change. In GB-A-1494128, the hydraulic circuit serves essentially as part of a feedback system, to give to the operator, by way of the lever, a reaction which provides some "feel" for the ratio-changes that he has brought about by way of the direct mechanical connection.

SUMMARY OF THE INVENTION

According to the present invention we provide a continuously-variable ratio transmission (CVT) including a double-acting hydraulic ram comprising a piston and a pair of opposed hydraulic cylinders, and in which the fluid contents of both cylinders are connected to physical displacement means operable by a human operator, and characterised in that the CVT is of the toroidal-race rolling-traction type, in that the ratio transmitted by the traction-transmitting rollers is determined by the position of the piston, and in that the physical displacement means comprise separate physical displacement members connected to the opposed hydraulic cylinders of the ram whereby by simultaneously depressing one member, and releasing the other, the operator changes the transmitted ratio by displacing the ram piston by which that ratio is determined.

The two displacement members may be connected to opposite arms of a rocking pedal or other lever.

The members may be pistons movable within respective hydraulic cylinders, each cylinder being mounted within a hydraulic reservoir and having a filler port for hydraulic fluid formed in the cylinder wall, whereby release of the piston beyond a certain point exposes the working space of the cylinder cavity to the reservoir and so tops up the hydraulic line between that member and the ram, in readiness for the next depression of the member. The members may move in parallel cylinders whose axes lie in the plane of rotation of the rocking pedal, and the action of the lever may be such as to promote a mode of operation in which the fluid volume swept by the piston depressed, by any actuation of the pedal, tends slightly to exceed the volume swept by the pedal released, and so tends automatically to maintain the hydraulic system filled with fluid and to avoid cavities. This may be achieved by giving the rocking pedal the form of an angled lever, in which the pivot axis is displaced from the straight line joining the two points through which the lever makes contact with the two pistons or other displacement members.

The invention particularly includes an automobile vehicle including such a CVT.

DESCRIPTION OF THE PREFERRED EMBODIMENT

Figure 2A:
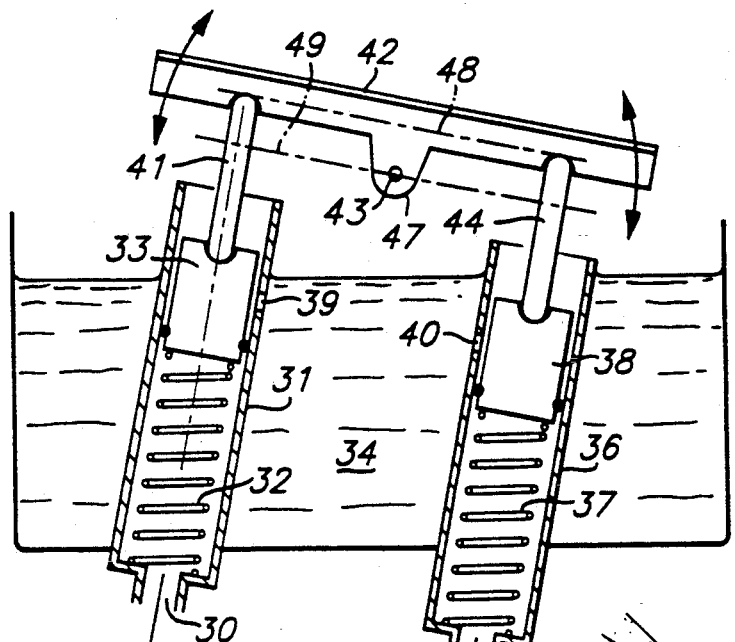
FIG. 2A diagrammatically shows the components for the CVT of an automobile vehicle.
Figure 2B:
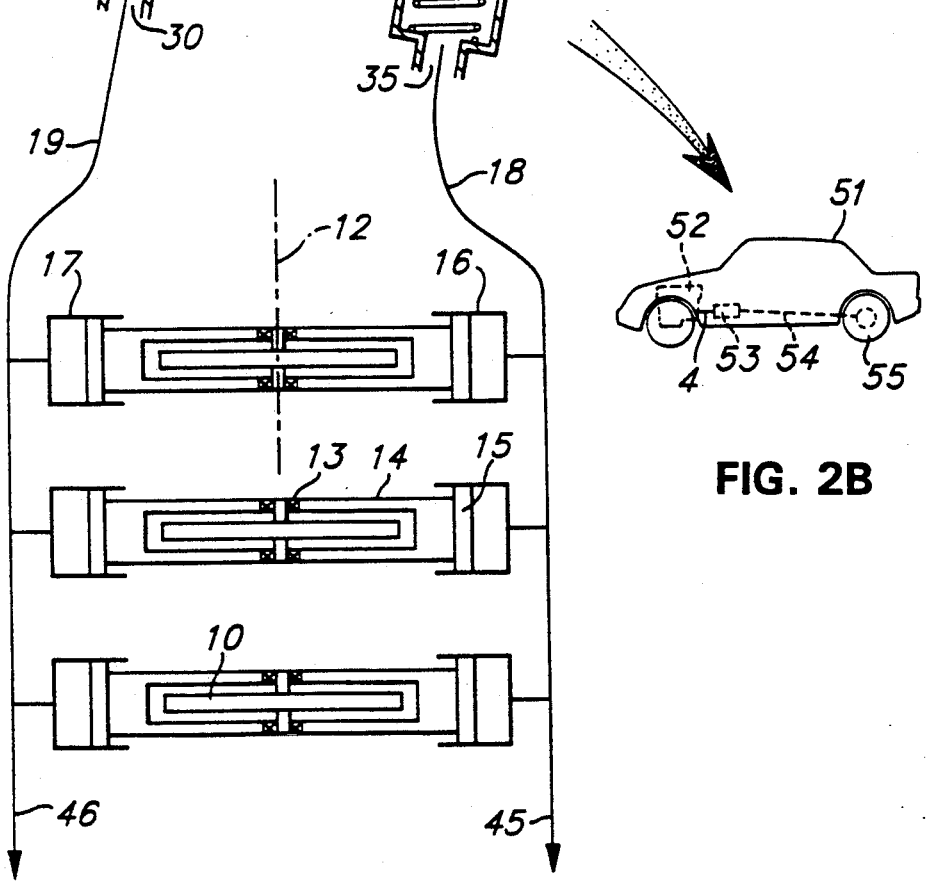
FIG. 2B diagrammatically shows an automobile vehicle.

The invention will now be described, by way of example, with reference to FIGS. 2A and 2B of the accompanying drawings, which shows components of the CVT for an automobile vehicle diagrammatically and/or schematically.

Figure 1A:
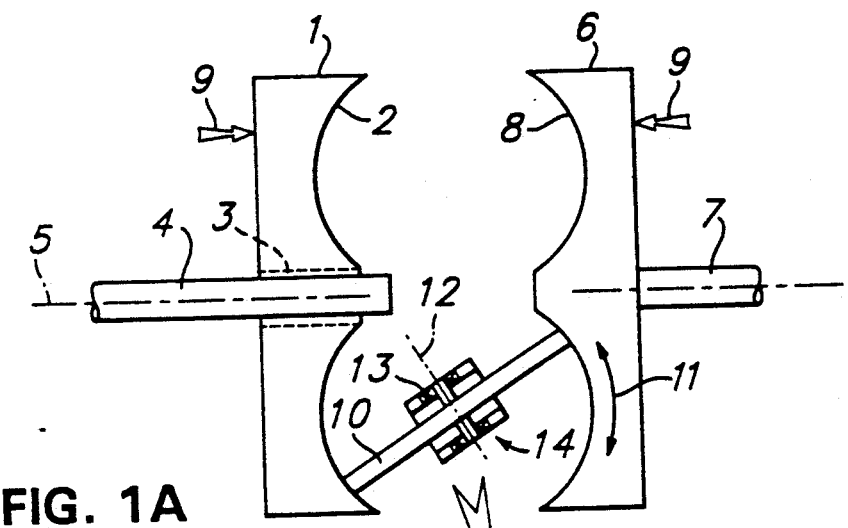
FIGS. 1A and 1B diagrammatically illustrate the essential components of a CVT.
Figure 1B:
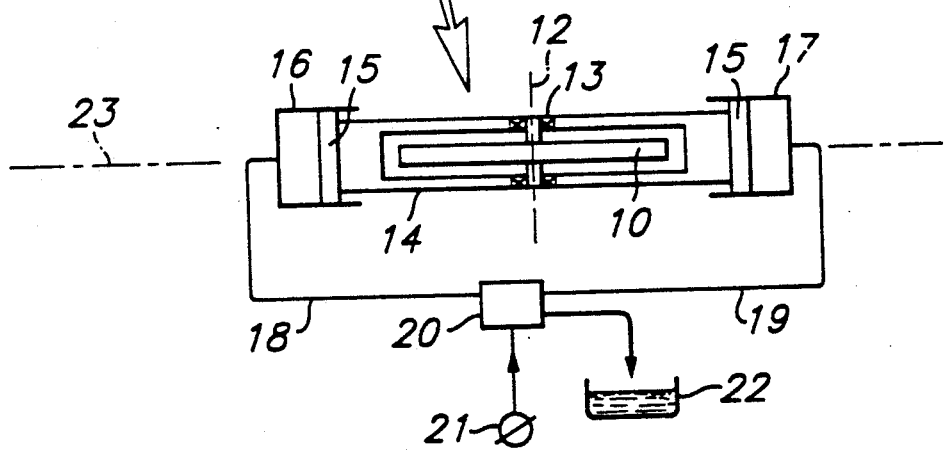

FIG. 2 does not show the input disc 1 and output disc 6 of FIG. 1, but it does show all three of the set of rollers 10 that transmit traction between them. As before, each roller 10 pivots about an axis 12 in a bearing 13 mounted on its carriage 14, and the carriage ends are formed as pistons 15 moving within cylinders 16 and 17. FIG. 2 also makes it clear that all the cylinders 16 in the set are hydraulically connected by lines 18, and that all cylinders 17 are similarly connected by lines 19, so ensuring that the cylinder pressures acting on all the carriages are equal at all times, and so promoting the transmission of exactly the same ratio by all the rollers 10 at all times. This method of equalising the ratio angles of all the rollers is also known generally in the art, and taught specifically in U.S. Pat. No. 4,662,248. According to the invention however, and as shown in FIG. 2, line 19 also connects cylinders 17 to the outlet 30 of a cylinder 31 containing a compression spring 32 and a piston 33. Similarly, line 18 connects all the cylinders 16 to the outlet 35 of a cylinder 36 containing a compression spring 37 and a piston 38. Cylinders 31, 36 are mounted within a hydraulic fluid reservoir 34 and inlet ports 39, 40 are located at high level within the side walls of cylinders 31, 36 respectively, so that they come into communication with the working spaces of their cylinders only when the respective pistons 33, 38 are close to the tops of their strokes. A rod 41 connects a rounded recess formed in the top of piston 33 with a corresponding recess formed in the underside of a pedal 42, mounted to rock about a pivot 43, and a similar and parallel rod 44 connects a similar recess on the top surface of piston 38 with another recess formed on the underside of pedal 42 but this time to the other side of pivot 43.

Pedal 42 is intended to be operated by the foot of the operator of the CVT, for instance the driver of a vehicle in which the CVT is used. If the driver pivots pedal 42 clockwise about pivot 43, so that rod 44 and piston 38 are depressed while rod 41 and piston 33 are released, the pressures in all of cylinders 16 will rise equally, while the pressures in all of cylinders 17 will fall equally. Carriages 14 will all therefore tend to move to the left, so that the angular setting of all three of rollers 10 about their respective axes 23 will change equally, so altering the transmitted ratio. Conversely, if pedal 42 is pivoted anti-clockwise about pivot 43, the pressure will rise in cylinders 17 and fall in cylinders 16, so that the angular setting of rollers 10 will change in the opposite sense and so alter the transmitted ratio in the opposite sense also. If the driver pivots pedal 42 fully clockwise, so that piston 38 is fully depressed and rollers 10 are at the corresponding extreme of their angular range, piston 33 rises high enough to uncover port 39, so allowing fluid from reservoir 34 to enter cylinder 31 and make up for any fluid losses that may have occurred in line 19 or the rest of the left-hand side of the system. Similarly, if pedal 42 is pivoted fully anti-clockwise, port 40 will uncover and the right-side of the system will be topped up.

Only a single input disc (1) and output disc (6) are shown in FIG. 1, and CVT's of the toroidal-race rolling-traction type, having only a single such disc of each kind, are known in the art and are often described as "single-side" or "single-ended". However the type of CVT shown in GB-C-2023753 and U.S. Pat. No. 4,662,248 is perhaps better-known in the art, and is often called "double-sided". Typically, in such a CVT, a single output disc, formed with a toroidal race on each of its faces, is located between two coaxial and inwardly-facing input discs which rotate together. One set of rollers (such as items 10) transmits traction between one of the input discs and one of the races on the output disc, and a second set of rollers transmits traction between the other input disc and the other output disc race. It is of course vital that at any one time all the rollers, whether in one set or the other, lie at the same angular setting and so transmit the same ratio between their respective input and output races. This is easily achievable in principle by the control system shown in FIG. 2; the hydraulic lines 18, 19 may connect not only (as shown) the cylinders 16 and 17 of one set of rollers, but also, as indicated at 45 and 46, may go on to supply the corresponding cylinders of a second or even subsequent sets of rollers.

By locating pivot 43 on a flange 47, as shown, a useful effect may be obtained. Pivot point 43 is thus displaced from the imaginary straight line 48 which joins the recesses at which rods 41, 44 make contact with lever 42. Reference 49 indicates another imaginary line, which passes through pivot 43 and lies at right angles to rods 41 and 44. Provided the system is designed so that the heads of the two rods never pass below line 49, then whenever lever 42 is pivoted clockwise, so that piston 38 is depressed and piston 33 released, the fluid volume swept by depressed piston 38 will exceed that swept by released piston 33. Similarly, if lever 42 is pivoted anti-clockwise, the volume swept by depressed piston 33 will exceed that swept by released piston 38. Provided the offset of pivot 43 from line 48 is small the excess will be small also, and without distorting the normal operation of the system will have the effect of promoting a small positive pressure at all times within the closed hydraulic circuit, so helping to avoid the formation of vacuums and other cavities.

As already indicated the invention applies not only to CVT's but also to automobile vehicles including them. In the arrowed insert to FIG. 2A, labelled as FIG. 2B, such a vehicle is indicated in outline at 51 and its engine schematically at 52. The CVT, including for example parts illustrated in the rest of FIG. 2, is indicated at 53 schematically, as are the connection 54 between the CVT output and the driven wheels 55 of the vehicle.

I claim:

1. A continuously-variable-ratio transmission (CVT) including a double-acting hydraulic ram comprising a piston (15) and a pair of opposed hydraulic cylinders (16, 17), and in which the fluid contents of both cylinders are connected to physical displacement means (31, 36, 42) operable by a human operator, wherein the CVT is of the toroidal-race rolling-traction type, the ratio transmitted by traction-transmitting rollers (10) of the CVT is determined by the position of the piston (15), and the physical displacement means comprise two separate physical displacement members (33, 38) connected hydraulically and respectively to the opposed hydraulic cylinders (17, 16) of the ram whereby by simultaneously depressing one said displacement member (33) and releasing another said displacement member (38) the operator changes the transmitted ratio by displacing the ram piston (15) by which that ratio is determined, and the two displacement members (33, 38) thus depressed and released are connected to opposite arms of a rocking member (42).

2. A CVT according to claim 1, wherein the two displacement members (33, 38) are pistons movable within respective hydraulic cylinders (31, 36), each cylinder having a cylinder wall and being mounted within a hydraulic reservoir (34) and having a filler port (39, 40) for hydraulic fluid formed in the cylinder wall, whereby release of the piston beyond a certain point exposes a working space of the cylinder cavity to the reservoir and so tops up the hydraulic line (19, 18) between that member and the ram, in readiness for a next depression of the member.

3. A CVT according to claim 1, wherein the two displacement members and the rocking member are so arranged that the fluid volume swept by the displacement member depressed by operation of the member exceeds the fluid volume simultaneously swept by the displacement member released.

4. A CVT according to claim 3, wherein the rocking member (42) has a rocking pivot (43) which is displaced from a straight line (48) joining the points through which the member makes contact with each of the two displacement members.

5. An automobile vehicle comprising a continuously-variable-ratio transmission (CVT) including a double-acting hydraulic ram comprising a piston (15) and a pair of opposed hydraulic cylinders (16, 17), and in which the fluid contents of both cylinders are connected to physical displacement means (31, 36, 42) operable by a human operator, wherein the CVT is of the toroidal-race rolling-traction type, the ratio transmitted by traction-transmitting rollers (10) of the CVT is determined by the position of the piston (15), and the physical displacement means comprise two separate physical displacement members (33, 38) connected hydraulically and respectively to the opposed hydraulic cylinders (17, 16) of the ram whereby by simultaneously depressing one said displacement member (33) and releasing another said displacement member (38) the operator changes the transmitted ratio by displacing the ram piston (15) by which that ratio is determined, and the two displacement members (33, 38) thus depressed and released are connected to opposite arms of a rocking member (42).

* * * * *